United States Patent Office 3,817,786
Patented June 18, 1974

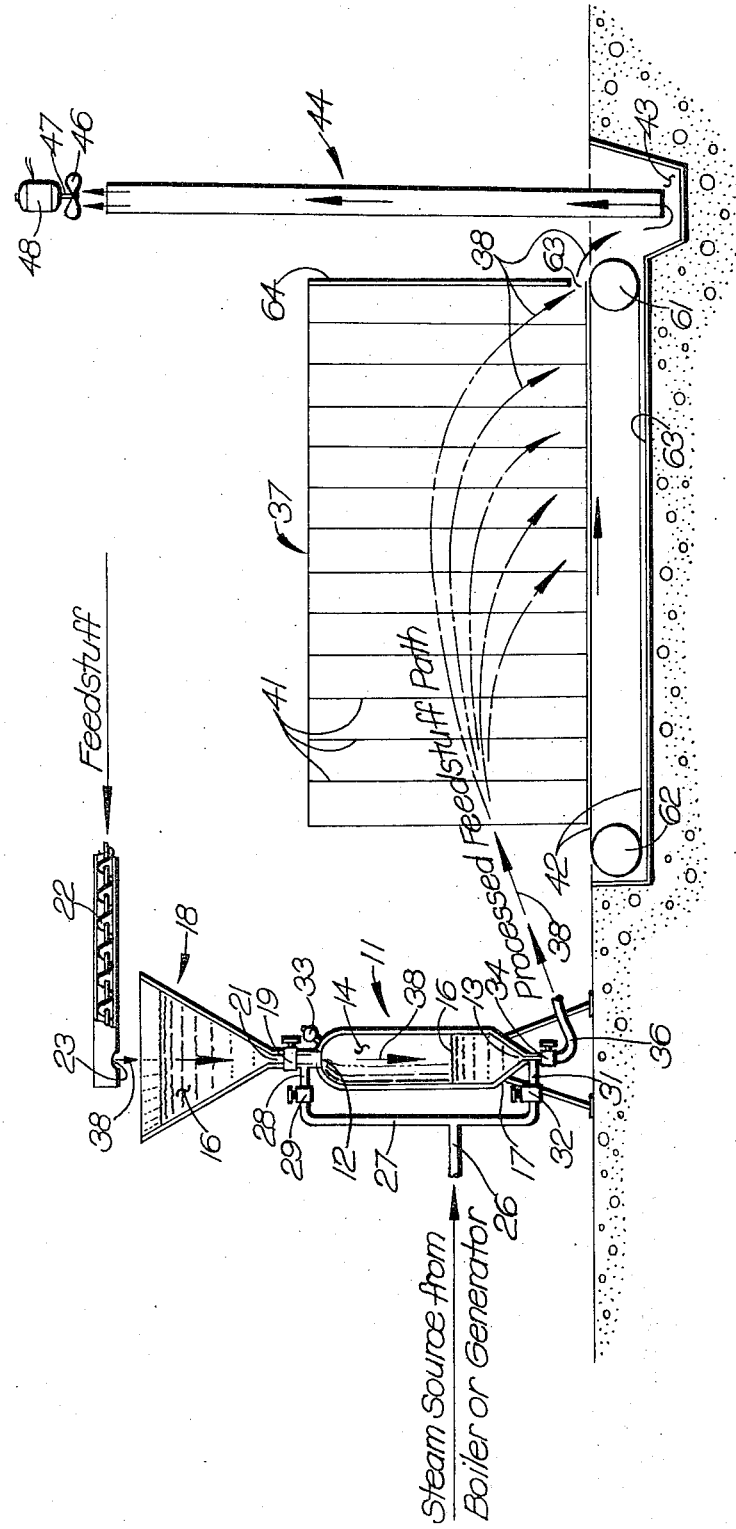

3,817,786
EQUIPMENT FOR CONVERTING THE PHYSICAL AND COMPLEX MOLECULAR BOND STRUCTURES OF NATURAL FEEDSTUFFS FOR RUMINANT ANIMALS TO DIFFERENT AND LESS COMPLEX MOLECULAR BOND STRUCTURES THEREOF
John W. Algeo, Santa Ynez, Calif., assignor to Santa Ynez Research Farm, Santa Ynez, Calif.
Original application Sept. 22, 1967, Ser. No. 674,050, now Patent No. 3,667,961. Divided and this application Sept. 17, 1971, Ser. No. 181,419
Int. Cl. A13k 1/02; A23k 1/14
U.S. Cl. 127—1
9 Claims

ABSTRACT OF THE DISCLOSURE

Economical equipment for effecting the conversion of the molecular bond structures of ruminant animal feedstuffs to different less complex molecular bond structures with concomitant degradation of relatively ingestible molecular structures to shorter chain length more digestible carbohydrates; the molecularly rearranged end products having the unique capacity of beneficially stimulating rumen microfloral metabolism to produce increased levels of steam volatile fatty acids having a more beneficial proportion of proprionic and higher molecular weight fatty acids. The equipment comprises a closed pressure vessel into which a quantity of ruminant animal feedstuff is introduced and confined in an area of predetermined size and into which steam under high pressure at high temperature is delivered onto the confined feedstuff to saturate the same, with a restricted outlet through which the confined saturated feedstuff is explosively ejected to ambient pressure and temperature upon the expiration of a predetermined time interval of steam saturation.

---

This application is a division of my co-pending application, Ser. No. 674,050, filed Sept. 22, 1967, which has now matured to United States Letters Patent No. 3,667,-961 and entitled Process of Improving Digestibility of Feedstuffs For Ruminant Animals.

In general, the invention relates to pressure vessels, and more particularly relates to a specially constructed vessel and attendant apparatus for receiving, treating and ejecting certain feedstuffs for ruminant animals as well as for converting normally non-feedable or low value wastes, such as coffee grounds from instant coffee manufacture, olive pits, winery waste and field refuse such as straws and the like to usable feedstuffs for ruminant animals. The equipment of the present invention effects the production of ruminant animal feedstuffs of increased digestibility with concomitant enhanced nutrient availability.

It is perhaps well known that heretofore in the art equipment has been provided for steaming natural feedstuffs for ruminant animals at atmospheric pressure, together with flaking rolls through which the steam feedstuffs are passed. The feed value of such treated feedstuffs has been aided to a relatively small degree. Another more recent means involves the use of a pressure cooker wherein the natural feedstuffs are cooked at approximately 40 to 60 p.s.i. followed by flake rolling of the cooked feedstuffs in continuous flow machines of relatively complex construction which require appreciable maintenance and are costly to operate. For the most part, the foregoing prior equipment accompanied by steam rolling, has been restricted to cereal grains and only incompletely alter starch structures and has no effect on cellulose compounds. The present invention is directed to the provision of improved equipment which obviates the disadvantages of prior apparatus and which is efficaceously applicable to the treatment of hitherto poorly digestible materials as well as well digestible material such as grains, and also to the treatment of either single feedstuffs or of complex mixtures of feedstuffs to afford complete rations.

A primary object of my invention is to provide equipment for converting the molecular bond structure of ruminant animal feedstuffs thereby enabling said feedstuffs when injested to be digested to a higher degree causing an improvement in total steam volatile fatty acid synthesis by the rumen microfloro as well as an improvement in the ratio of propionic and higher molecular weight fatty acids synthesized by subjecting initial natural feedstuffs to high pressure steam under confined conditions; the equipment being capable of effecting explosive release of the steam saturated feedstuffs from confinement through a restricted area to atmospheric conditions upon the expiration of a predetermined time interval of steam saturation.

Another important object of the invention is to provide equipment of the indicated nature which is characterized by the inclusion of automatic controls for the introduction of the natural feedstuffs to confinement, for introducing the high pressure steam to saturate the confined feedstuffs for controlled time intervals, and for explosively releasing the saturated feedstuffs to the atmosphere simultaneously with the expiration of the predetermined and controlled time interval.

A still further object of the invention is to provide equipment of the aforementioned character which is relatively inexpensive to manufacture and to maintain, as compared with currently used steaming and flaking installations.

Other objects of the invention, together with some of the advantageous features thereof will appear from the following description of an embodiment of the invention which is illustrated in the accompanying drawings and the best mode of constructing and manner of using the same. It is to be understood that variations thereof are included in the appended claims.

Referring to the drawings:

FIG. 1 is a schematic view and flow sheet of the manner of carrying out the invention, this view showing in front elevation an embodiment of the equipment employed.

The embodiment of my equipment illustrated in the annexed drawing, as a best mode of constructing the same and the manner of using it, preferably comprises an airtight vessel in which a charge or a number of charges of natural ruminant feedstuffs are disposed, together with means for introducing high pressure steam below and above the charge while confined in said vessel for a predetermined time interval and means for discharging the steam saturated charge into the atmosphere where it can be collected and dried as a bulky sponge-like mass wherein the molecular bond structure is irreversibly altered from the structure of the natural feedstuff.

As shown, I provide a pressure vessel which is generally designated by the reference numeral 11 and which preferably is fabricated from a suitable metal such as steel or a steel alloy or the like. The pressure vessel 11 is so formed as to provide an inlet 12 in the top thereof as well as a relatively small, narrow outlet 13 in the bottom thereof, and defines a relatively large chamber 14 for the reception and retention of natural ruminant feedstuffs 16 which may be all one substance or may be an admixture of a number of different feedstuffs. The pressure vessel 11 also is so formed adjacent to the bottom thereof as to provide tapering walls, as at 17, which converge toward the outlet 13 in order to facilitate the flow of material from chamber 14 of the vessel through the narrow orifice or outlet 13 of the vessel. Associated with the vessel 11 is a hopper 18 which may be formed integral with vessel 11 and which conveniently is in the general form of an inverted cone defining a relatively wide mouth or inlet and a relatively small narrow outlet; such hopper serving to receive and temporarily retain charges 16 of feedstuffs for delivery to the pressure vessel 11 by means of a valve-controlled pipe 19 which establishes communication between the outlet 21 of the hopper and the chamber 14 of vessel 11. The hopper 18 may be repetitively filled manually or may be filled with metered amounts of natural ruminant animal feedstuffs delivered automatically from a standard screw conveyor 22 which is repetitively placed in motion under the control of a sensor, not shown, provided with a sensing actuator, also not shown, disposed at a predetermined level in the hopper and connected to a sensor switch which, in turn, is electrically connected to a motor, all not shown, for recurrently driving the screw conveyor 22 to feed additional amounts of feedstufls to the hopper through the outlet 23 of the conveyor which is disposed in overlying relationship to the inlet of hopper 18 as shown.

In accordance with my invention, a source of steam, such as a boiler, not shown, is provided for supplying steam under high pressure to the chamber 14 of the pressure vessel 11, and a steam line or conduit 26 is connected between the outlet of the boiler and a steam head 27 which is formed with outlet lines at the top and bottom thereof. The top oulet line 28 from the steam head 27 is provided with a valve 29 and steam under pressure through valve-controlled line 28 is delivered to the chamber 14 of the pressure vessel 11 onto the top of the charge 16 of feedstuff disposed in the vessel. The bottom outlet line 31 from the steam head 27 is provided with a valve 32, and steam under high pressure is delivered through such valve-controlled bottom steam line 31 into the chamber 14 of pressure vessel 11 to the bottom of the charge 16 of feedstuffs. Thus, with steam under relatively high pressure from below, and steam under pressure from above, the charge 16 of feedstufls is thoroughly saturated with steam, and this is continued until the pressure within chamber 14 attains a predetermined pressure per square inch commensurate with the physical and chemical structure or structures of such particular charge 16, or admixtures of feedstuffs that are disposed and confined within chamber 14 and subjected to the steam saturation.

Conveniently, the pressure vessel is equipped with a conventional pressure guage 33 for ready visual observation at all times of the pressure build up within chamber 14 with which the pressure guage is in communication. When the pressure per square inch has attained a predetermined value, as steam is applied to the charge 16 of feedstuffs for a predetermined time interval, hereinafter explained, in respect to the different feedstuffs under steam saturations, a valve 34 in outlet line 36 is opened at the expiration of the predetermined time interval, either manually or automatically, to effect ejection of the steam saturated feedstuffs under explosive force and with appreciable velocity from chamber 14 of the vessel 11 through the outlet 13 and through the terminal end of the associated outlet pipe 36 into the atmosphere. This explosive release renders an irreversible molecular bond charge from the molecular bond structure of the feedstuffs initially disposed in chamber 14 to the different and less complex bond structure of the end product which is appreciably more digestible by the ruminant animal than theretofore.

As indicated in the figure of the annexed drawings, outlet pipe 36 is maintained at an inclination to the horizontal to give the explosively released feedstuffs a trajectory that will carry the same to an area where the feedstuffs can be collected and thoroughly dried by means of suitable apparatus shown schematically and designated generally by the reference numeral 37; the trajectory being indicated by the arrows 38 to carry the ejected feedstuffs through a series of screen baffles 41 of collector 37 from which the feedstuffs fall by gravity onto conveyor 42 and into a bin 43 from which they are lifted by an air lift 44, indicated by reference numerals 46, 47 and 48. As shown, an end panel 64 on collector 37 terminates short of the space 63 to permit the conveyor to pass through the collector 37 to bin 43. Other means, of course can be employed for the collecting and drying of the processed feedstuffs.

The explosive force generated by the release of the substances subjected, as confined in chamber 14 of pressure vessel 11, to the relatively high temperature and high stream pressure and thereafter released to the extremely low atmospheric pressure and temperature effectively renders or breaks down the higher molecular weight carbohydrates or typical roughages present in the feedstuffs or admixtures of the rations, thus enhancing digestibility of the total diet rather than just the grain portions. For example, hemi-celluloses and starches are converted to dextrins, sugars and more digestible compounds.

I have found that the pressures to be attained, and the time intervals for which the confined feedstuffs are to be subjected to in the chamber 14 of the pressure vessel by the high pressure steam, prior to release to atmospheric conditions, are very critcal for each commodity for optimum digestibilty in the rumen of the ruminant animal, and are approprimately as indicated in Table F below, for the indicated ruminant animal feedstuffs:

TABLE F

| Feedstuffs | Time (min.) | Pressure (p.s.i.) |
| --- | --- | --- |
| Milo grain | 0.5–1.00 | 120–250 |
| Corn | 0.5–1.00 | 120–250 |
| Barley | 0.5–1.00 | 120–250 |
| Cull beans | 0.5–1.00 | 120–250 |
| Alfalfa seeds and screenings | 1.00–1.50 | 200–350 |
| Alfalfa hay | 1.00–1.50 | 400–500 |
| Alfalfa straw | 1.00–1.50 | 400–500 |
| Grain straws | 1.00–1.50 | 400–500 |
| Almond hulls | 0.50–0.75 | 150–190 |
| Almond shells | 3.00–4.00 | 600–700 |
| Coffee grounds | 4.00–5.00 | 900–1,000 |

From the foregoing examples, it will be observed that the feedstuffs, a natural commodity, is introduced singly or as an admixture of two or more substances, into pressure vessel 11 through input control valve 19, and steam under pressure from a steam generator or boiler is introduced rapidly to a desired level which is 120–250 p.s.i. for cereal grain and seeds, and 500 to 1,000 p.s.i. for cellulosic feedstuffs such as all common roughages including hays, straws and the like, as well as for such lignocellulosic feedstuffs as cottonseed and rice hulls, nut shells or coffee grounds. After subjection to the high steam pressure and for the time intervals indicated in Table F, the feedstuff is explosively discharged from confinement in chamber 14 of the vessel 11 through the relatively small narrow orifice or outlet 13, which is approximately 10% to 15% of the inside diameter of the vessel, the explosive discharge consuming approximately 1 to 20 seconds, depending upon the amount of the charge disposed in the chamber, and exerting such force as to create an irreversible molecular rearrangement within the steam saturated feedstuff with concomitant degradation of complex relatively indigestible molecular structures to shorter chain length more digestible carbohydrates. In actual practice, I have found it desirable for optimum results, first to open steam input valve 32, see FIG. 1, at the bottom of the pressure vessel 11 and admit high pressure steam into the chamber 14 from the bottom of the charge 16, and cause the steam to move upwardly through the charge, thus saturating all particles of the charge thoroughly with the steam. Then, to open input valve 29 at the top of vessel 11 to admit high pressure steam through steam line 28, as well as leaving valve 32 open to continue to admit steam to chamber 14 from the bottom along with the admitted steam from the top until the desired pressure for the feedstuff under treatment is attained, as indicated by pressure guage 33, at which time both valves 29 and 32 are closed and upon the expiration of a predetermined time interval, see Table F above, the valve 34 in outlet line 36 is opened to discharge the contents of chamber 14 to the atmosphere through outlet orifice 13. It may be observed here that where heavier loads of feedstuffs occupying more than one-third of chamber 14 are to be discharged and the chamber evacuated, the valve 29 in top steam input line 28 is left open to insure completion of the evacuation of the charge from the chamber 14.

Since the temperatures attained within the pressure vessel 11 approximate 400° F. to 850° F. in respect to grain feedstuffs and approximately 470° to 540° F. in respect to roughage, pesticide residues which may be present in the introduced feedstuffs are effectively volatilized and destroyed. This reduction in otherwise harmful pesticides by the use of the hereinabove described equipment for improving the digestibility of ruminant animal feedstuffs facilitates the safe use of previously condemned or quarantined feedstuffs in live stock feeding.

The equipment hereinabove described has advantageous uses for treatment of normally non-feedable substances, such as coffee grounds resulting from instant coffee manufacture. With the steam introduced at pressures ranging between 900 to 1000 pounds per square inch and at temperatures ranging between 470° F. to 540° F., the coffee grounds are converted after a steam saturation period of 4 to 5 minutes to useable feedstuffs for ruminant animals having substantially the same advantageous features as hereinabove mentioned in respect to the conversion of natural grain feedstuffs to the shorter chain carbohydrates of different less complex more digestible feedstuffs possessing beneficial changes in rumen microfloral metabolism and increasing nutrient availability. The equipment likewise can be similarly employed for conversion of such non-feedable substances as winery waste and field refuse such as straws to useable feedstuffs with the subjection of such substances under confinement in the pressure vessel to steam at 900–1000 pounds per square inch pressure at approximately 470° F. to 540° F. to thoroughly saturate the waste for approximately 4 to 5 minutes and then explosively released from confinement.

The appended claims are intended to cover variations of the equipment within the scope and purview of the invention.

I claim:

1. Equipment for converting the physical and molecular bond structure of complex carbohydrates such as cellulose, hemi-cellulose and starch which are contained in ruminant animal raw natural feedstuffs to a less complex and more digestible molecular bond structure thereof; said equipment comprising a hopper having an outlet for holding a quantity of a flowable natural feedstuff for ruminant animals, a pressure vessel having an inlet and a restricted outlet coaxial with said inlet and with a major axis of said vessel; said pressure vessel comprising an elongated hollow body of cylindrical cross-section extending from said inlet for a major portion of its length and merging with a portion of conical cross-section terminating at said restricted outlet, a valve-controlled pipe establishing communication between said outlet of said hopper and said inlet of said pressure vessel for introducing an amount of said natural feedstuff for ruminant animals by gravity flow into said vessel to provide a confined charge thereof therein when said inlet and restricted outlet of said pressure vessel are closed, means for supplying steam under relatively high pressure within said vessel and onto said charge of confined feedstuff to saturate the same with steam for a predetermined time interval, and means for effecting upon the expiration of said predetermined time interval rapid ejection of the steam saturated confined natural feedstuff from said vessel to the atmosphere causing said feedstuff to undergo explosive decompression.

2. Equipment as set forth in claim 1, and means for collecting and drying the ejected feedstuff.

3. Equipment as defined in claim 1, including a pipe fitted to said vessel at its restricted outlet end establishing communication between said restricted outlet and the atmosphere, and an operable valve in said pipe to control the explosive emission of said confined natural feedstuff from said restricted outlet into the atmosphere and for effecting molecular changes in said confined natural feedstuff for the purpose of inducing beneficial changes in rumen microfloral metabolism causing increase in steam volatile fatty acid fermentation upon ingestion thereof by a ruminant animal.

4. Equipment as defined in claim 1, including a pipe attached to said vessel for establishing communication between said restricted outlet and the atmosphere, an operable valve in said pipe for controlling the explosive ejection of said confined charge of natural feedstuff to ambient atmosphere conditions and for effecting molecular changes thereby in said natural feedstuff for the purpose of inducing changes in rumen microfloral fermentation upon ingestion thereof by a ruminant animal causing a beneficial increase in propionic acid and other higher molecular weight volatile fatty acids and a reduction in acetic acid.

5. Equipment as set forth in claim 1, wherein the means for supplying steam within said vessel comprises a source of steam under relatively high pressure, a first valve-controlled conduit communicating with said source of high pressure steam and the interior of said vessel to supply the steam onto said charge of confined natural feedstuff from above the same and a second valve-controlled conduit communicating with said source of high pressure steam and the interior of said vessel to supply the steam onto said charge of confined natural feedstuff from below the same.

6. Equipment as set forth in claim 5, including means for operating the valve in said first valve-controlled conduit to an open position and maintaining the same in open position during said predetermined time interval and during the explosive ejection of said confined natural feedstuff from said vessel into the atmosphere thus enhancing decompression of said feedstuff.

7. Equipment as set forth in claim 1, and an operable value controlling said restricted outlet.

8. Equipment as set forth in claim 7 wherein the walls of said vessel converge to said restricted outlet.

9. Equipment as set forth in claim 8, wherein the diameter of said restricted outlet is approximately one-tenth of the inside diameter of said cylindrical portion of said vessel.

References Cited

UNITED STATES PATENTS

| | | | |
|---|---|---|---|
| 2,086,963 | 7/1937 | Scholler | 127—1 |
| 2,108,567 | 2/1938 | Scholler | 127—1 |
| 2,304,679 | 12/1942 | Christensen | 127—1 X |
| 2,681,871 | 6/1954 | Wallace | 127—1 |
| 3,404,071 | 10/1968 | Goos | 127—1 X |

MORRIS O. WOLK, Primary Examiner

S. MARANTZ, Assistant Examiner

U.S. Cl. X.R.

23—252 R, 260, 290.5; 99—323.4, 470; 127—28, 37; 426—312, 447, 807